Aug. 19, 1941.     J. T. TUCKER     2,253,214
PROCESSOR
Filed April 25, 1938     4 Sheets-Sheet 3
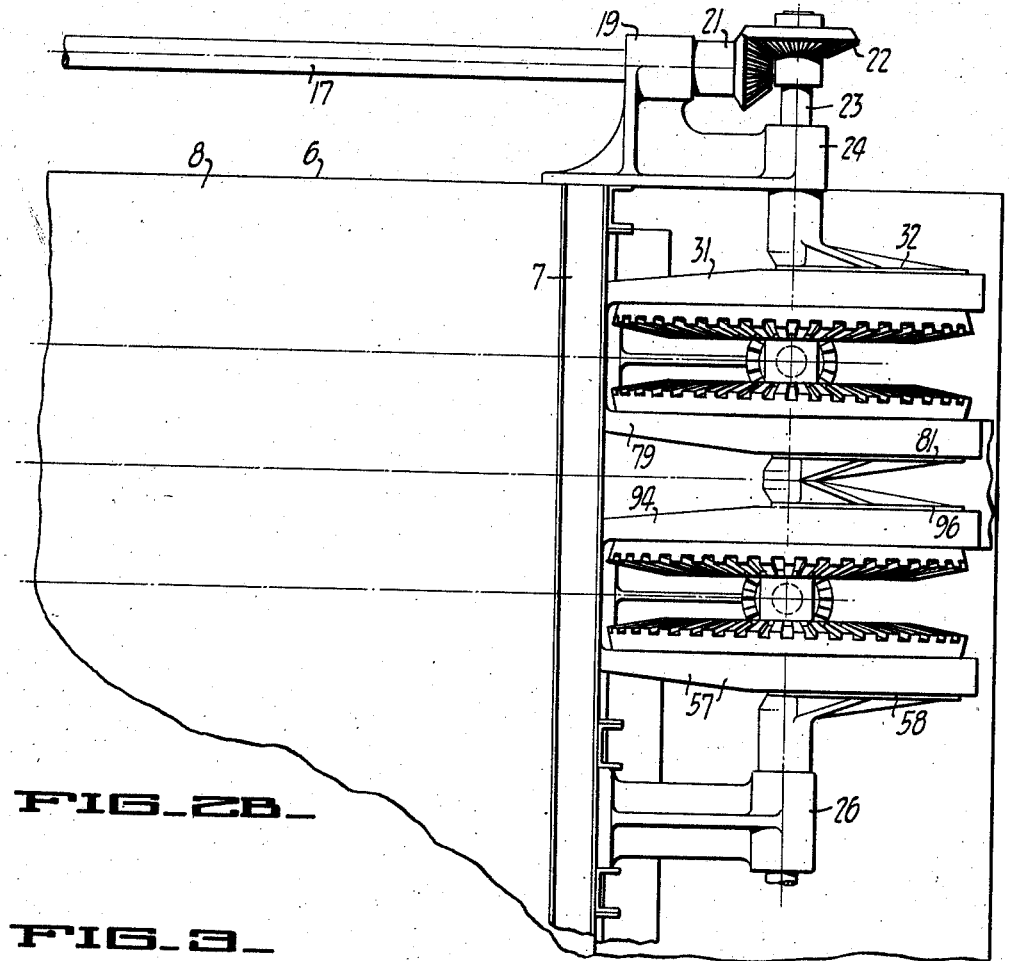
FIG_2B_
FIG_3_
FIG_4_
FIG_5_
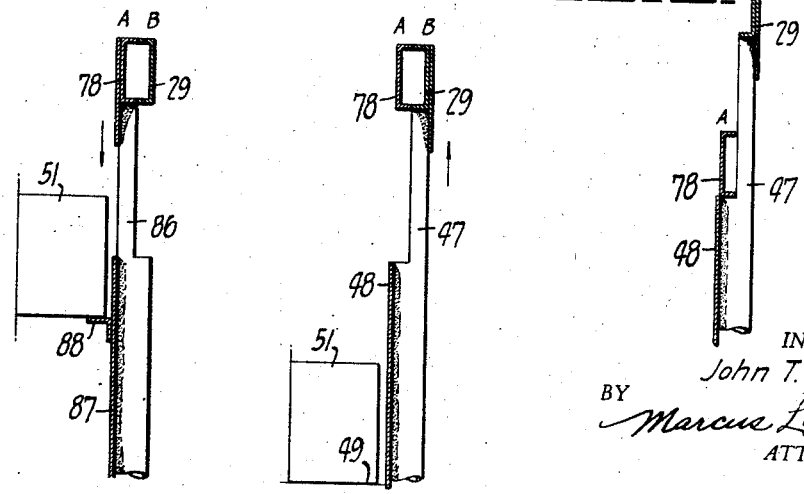
INVENTOR.
John T. Tucker
BY
Marcus Lothrop
ATTORNEY Aug. 19, 1941.  J. T. TUCKER  2,253,214
PROCESSOR
Filed April 25, 1938    4 Sheets-Sheet 4
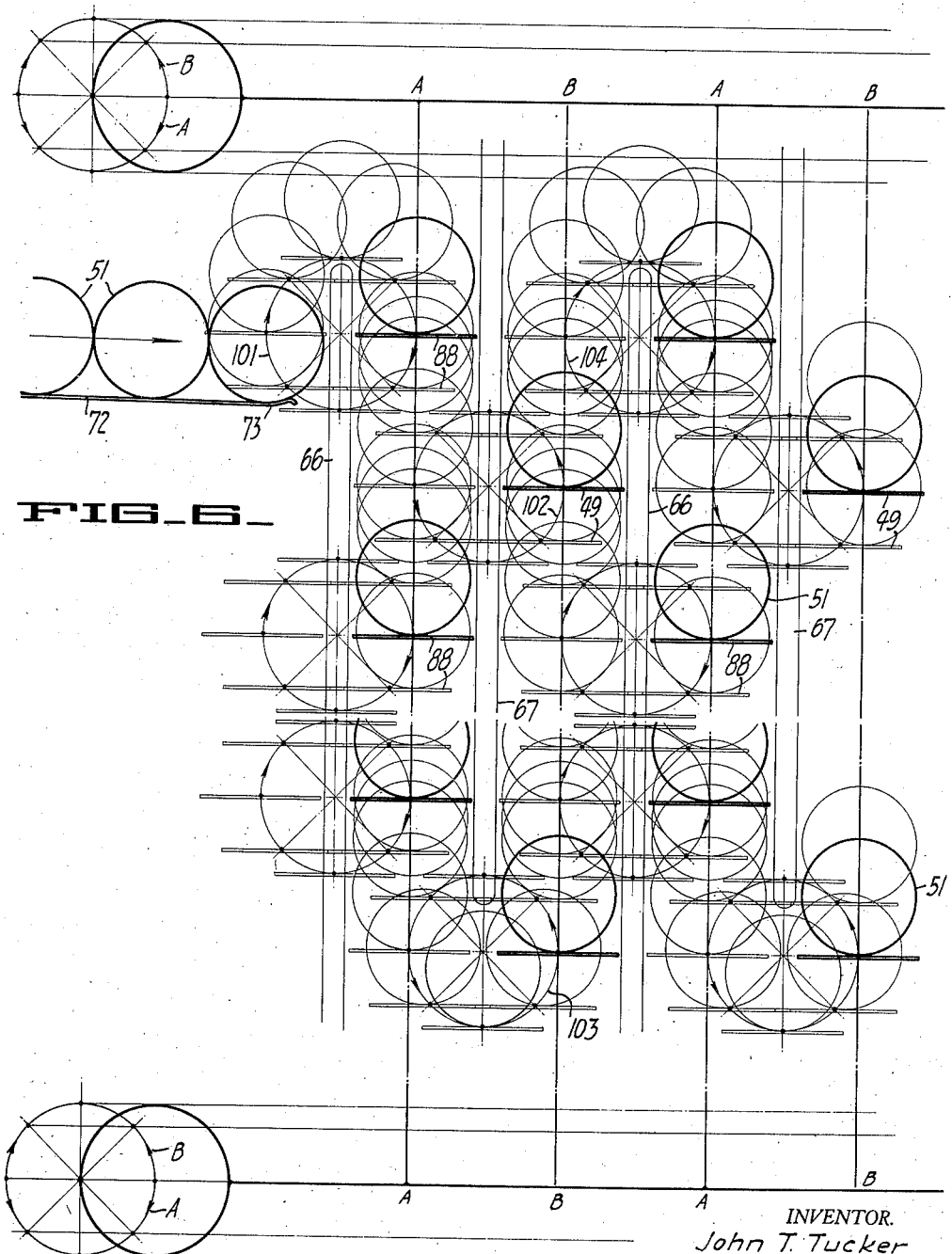
INVENTOR.
John T. Tucker
BY Marcus Lothrop
ATTORNEY Patented Aug. 19, 1941

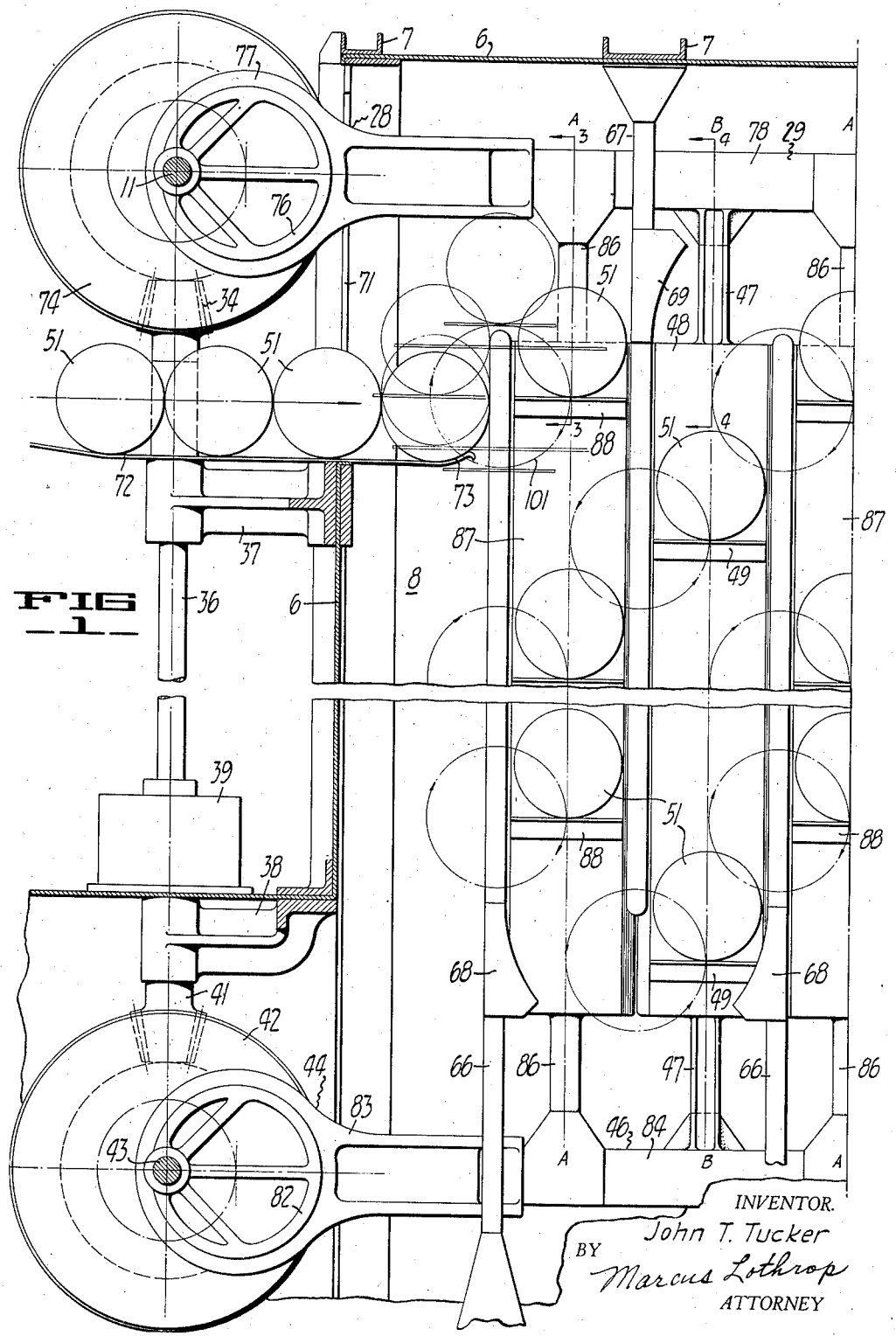

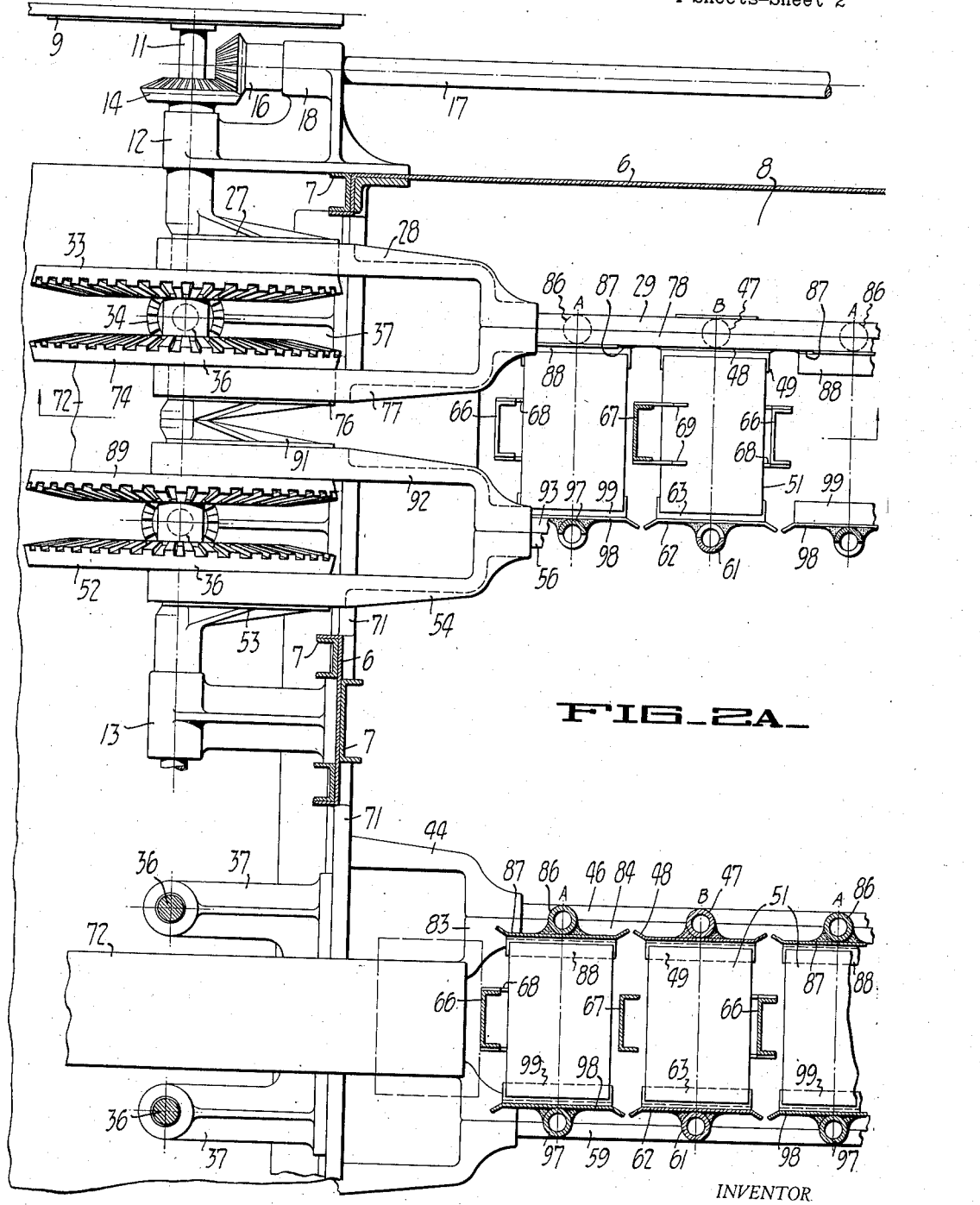

2,253,214

UNITED STATES PATENT OFFICE 2,253,214

PROCESSOR

John T. Tucker, Columbus, Ohio

Application April 25, 1938, Serial No. 204,155

14 Claims. (Cl. 198—218)

My invention relates to means for use in handling the preparation of canned goods and is especially concerned with a mechanism for assisting in the cooking of goods contained in cans. The invention is akin to that disclosed in my Patent No. 1,954,372, issued April 10, 1934, and entitled "Exhaust box." While the cooker of my invention is useful in various different environments and even under circumstances where no cooking is contemplated, nevertheless it is particularly applicable for use in canneries, for example, where floor space is at a premium yet canned produce must be propelled through a route of predetermined length in order to give the appropriate time of cooking, yet where the machinery for imparting the necessary progressive movement to the cans is subjected to elevated temperatures, to the action of hot water and steam, and to the necessity of operating for protracted and continuous periods without any material mechanical attention or supervision.

It is therefore an object of my invention to provide a cooker in which the desired length of cook can be produced without utilizing excessive floor space.

Another object of my invention is to provide a cooker in which the desired progressive movement is given to the cans by simple, reliable machinery.

Another object of my invention is to provide a cooker in which a certain amount of agitation is afforded the cans in order to facilitate heat transfer between the cooking fluid and the contents of the cans.

Another object of my invention is to provide a cooker having a very large capacity of cans in comparison with the volume of cannery space occupied.

In its preferred form, the cooker of my invention includes a housing within which a pair of carriers is disposed in position for carrying cans. The device includes means for imparting a rotary parallel motion to the carriers, so that, in co-operation with relatively stationary guides, the carriers, by virtue of a major motion component in a predetermined direction, propel the cans through the housing in a predetermined tortuous path.

While I refer herein to the structure of my invention as a cooker, and refer to the objects being handled as cans, it is to be understood that in various other applications of virtually the same mechanism, for example in pasteurizing bottled liquid, the operation will be referred to as pasteurization rather than cooking, and the objects will be referred to as bottles rather than cans; yet in order to simplify the description the mechanism is generally and comprehensively referred to herein as a cooker, and the objects handled are generally and comprehensively referred to as cans.

In the drawings, wherein is disclosed an embodiment of my invention by means of which the various objects thereof, together with others, are attained, Fig. 1 is a cross-section of a portion of a cooker in accordance with my invention, on a vertical, longitudinal plane, a portion of the figure being broken away to reduce its size;

Fig. 2a is a view of the mechanism shown in Fig. 1, but in cross-section on a plurality of horizontal planes progressively descending toward the bottom of the figure;

Fig. 2b is a plan of a portion of the cooker at an end opposite to that disclosed in Fig. 2a;

Fig. 3 is a fragmentary cross-section the plane of which is indicated by the line 3—3 of Fig. 1;

Fig. 4 is a fragmentary cross-section the plane of which is indicated by the line 4—4 of Fig. 1;

Fig. 5 is a composite cross-section corresponding to Figs. 3 and 4, with the parts out of phase 180°;

Fig. 6 is a diagram constituting a motion study substantially corresponding with the cross-section of Fig. 1 and showing the instantaneous positions of a plurality of cans progressing through the cooker.

As disclosed in the drawings, I provide a housing 6 which includes a suitable framework 7 for supporting the housing and provides a substantially closed interior chamber 8. Within the chamber are usually situated heating means, such as steam coils or a hot water bath, not shown since this heating means is well within the field of customary practice.

Within the housing is situated a plurality of can-retaining and advancing units, located side-by-side and operating in parallel. Since each of these units is identical with its neighbor, a description of but one of them will suffice. A driving pulley 9, rotated from any suitable source of power, is fast on a driving shaft 11 which is journaled in suitable brackets 12 and 13 secured to the framework 7 of the machine. On the shaft 11 is a bevel gear 14 meshing with a bevel pinion 16 fast on a longitudinal shaft 17 carried in the journals 18 and 19 (see Fig. 2b) and at its far end carrying a pinion 21. Meshing with the bevel pinion 21 is a bevel gear 22 mounted on a driving shaft 23 journaled in a bracket 24 on the framework 7 and also journaled in a bracket 26 on the framework. By the mentioned gearing the driving shafts 11 and 23 are rotated in unison and in the same direction. Since the mechanisms arranged on both of the drive shafts are substantially identical, being duplicated in reverse symmetry at opposite ends of the machine, a description of one end in detail will suffice.

Mounted on the drive shaft 11 and fast thereon is an eccentric 27 encompassed by an eccentric strap 28 to which is fastened a channel 29 extending throughout the length of the chamber 8 and at its far end secured to a comparable eccentric strap 31 encompassing an eccentric 32 fast on the drive shaft 23 and occupying the same phase position, with respect to the general framework of the machine, as does the eccentric 27. When the eccentrics 27 and 32 are rotated in unison, therefore, the channel 29 is accorded a rotary parallel motion. By "rotary parallel" motion as used in this description and in the claims, I mean that each point of the channel 29, for example, moves in a circle about its own individual center, and thus any line bounding or on the channel is, in any position, always parallel to itself in any other position it assumes during movement of the channel; in other words, the channel remains parallel to itself during its movement, and every point on the channel moves in a circular path having a fixed radius which radius is the same as the eccentricity of the eccentrics 27 and 32. Fixed on the drive shaft 11, alongside the eccentric 27, is a bevel gear 33 meshing with a bevel pinion 34 fast on a vertical shaft 36 journaled in brackets 37 and 38 on the framework and passing through gearing 39 to accord an appropriate direction of rotation to a bevel pinion 41 within the lower portion of the chamber 8 and meshing with a bevel gear 42 on a drive shaft 43 parallel with the shafts 11 and 23 and operated in unison therewith. An eccentric (not shown) on the drive shaft 43 corresponds to the eccentrics 27 and 32 and is encompassed by an eccentric strap 44 which, with a corresponding strap at the opposite lower portion of the machine directly below the strap 31, carries a channel 46. Since, due to their mounting, the channels 29 and 46 move bodily through the chamber with the same rotary parallel motion, I preferably join them at appropriate intervals by vertical bars 47, appropriately spaced apart longitudinally and preferably constituted of tubes or pipes the extremities of which, adjacent their fastenings to the channels 29 and 46, are cut away to provide half-round sections. Each of the bars 47 forms the support for an attached plate 48 which has its edges outwardly beveled and is coextensive with the intermediate portion of the bar which is not cut away. At appropriate intervals along the plate 48 there are mounted transverse angles 49 forming supports for objects such as the cans 51 which are to be handled by the machine.

All of the mechanism operating in unison with the rotation of the eccentrics 27 and 32, for example, is for the purpose of providing part of the support for the cans progressing through the machine, and, since it operates with a certain phase relationship with comparable mechanism to be described, is for convenience referred to in general as the "B" part of the supporting unit. Yet the part of the "B" unit described is only half of such unit, since the mechanism is substantially duplicated in mirror symmetry.

On the shaft 11 is a bevel gear 52 with which an eccentric 53 is associated. An eccentric strap 54 is connected to a channel 56 which extends longitudinally through the chamber 8 and is at its opposite end engaged with an eccentric strap 57 driven by an eccentric 58 on the drive shaft 23. A comparable channel 59 within the lower portion of the chamber 8 is comparably mounted and is driven in a fashion similar to that described in conjunction with the channel 56. Joining the channels 56 and 59 at appropriate intervals are vertical bars 61. The bars 61 are spaced opposite the vertical bars 47 and in every respect are comparable thereto. In a similar fashion each of them is cut away at its ends and, intermediate such cut-away portion, is provided with a plate 62 identical with the plate 48 and, at locations directly opposite the angles 49, carries comparable angles 63, so that the angles 49 and 63, considered together, form supports for opposite ends of the cans 51. The appropriately spaced bars 61 and their associated mechanism, operating exactly in accordance with the bars 47, are likewise part of the "B" support, so that all of the cans on the supports corresponding to the angles 49 and 63 follow exactly comparable paths of movement.

In order to confine the paths of can movement to a sinuous, predetermined channel, in accordance with my invention, I mount on the framework 7 a series of upright, stationary guides 66 extending upwardly from the bottom of the structure to appropriate points some distance from the top thereof. Alternately arranged with the guides 66 are comparable guides 67 which, although likewise mounted on the framework 7, depend from the top thereof and are spaced an appropriate distance from the bottom of the chamber 8, being interspersed with the uprights 66. Augmenting the guiding characteristics of the members 66 and 67 are side plates 68 and 69 affixed thereto respectively, to afford curved confinement to the cans adjacent the ends of each vertical path of the machine. In addition to the guides 66 and 67, I provide, adjacent the entrance opening 71 of the housing 6, an inlet plate 72 which receives the cans 51 from any suitable source and conducts them through the opening 71 to a position adjacent the first upright guide 66. A slight upward curvature 73 on the end of the plate 72 serves to retain the end can thereupon until it is removed therefrom.

The spacing of the alternated guides 66 and 67 is such that the center distance between successive portions of the sinuous path is equivalent to the diameter of the circle described by the bars 47, for example.

In accordance with my invention, I provide means comparable to the "B" supports for augmenting and supplementing such supports in supporting and propelling the cans through the defined path. Meshing with the bevel pinion 34 is a bevel gear 74 which is freely rotatable on the drive shaft 11 and carries an eccentric 76. The rotation of the bevel gear 74 is opposite in direction to that of the gear 33 but is at the same angular velocity. The eccentric 76 is arranged to occupy the same phase as the eccentric 27 when in the position shown in Fig. 1, for example. Encompassing the eccentric 76 is an eccentric strap 77 carrying a channel 78 facing the channel 29 and at its opposite end carried in an eccentric strap 79 encompassing an eccentric 81 rotatably mounted on the drive shaft 23 and accorded the same relationship to the eccentric 32 as the eccentric 76 bears to the eccentric 27. In the lower portion of the machine an eccentric 82 on the driving shaft 43 rotates in the same direction as, and bears the same phase relationship to the general framework of the machine as does the eccentric 76. A strap 83 encompasses the eccentric 82 and carries a channel 84 which extends to a comparable strap at the opposite end and lower portion of the machine. Spanning the channels 78 and 84 are vertical bars 86 each of which preferably constitutes a tube having its ends cut away on the sides opposite to the cut-away portion of the bars 47. The bars 86, however, are located intermediate or between the bars 47 and are spaced with respect thereto so as to occupy comparable positions at the end of adjacent portions of the path of can travel through the machine. The bars 86 and their associated supporting and driving mechanisms form an "A" mechanism which is in general comparable to the "B" mechanism but operates in an opposite direction thereto. On each of the bars 86 is a plate 87, at appropriate intervals carrying angle supports 88 for cans 51 resting thereupon.

The "A" system is inclusive not only of the mechanism described but also comparable mechanism affording support for the other ends of the cans arranged in mirror symmetry. Thus, on the drive shaft 11 is arranged an appropriately driven bevel gear 89 carrying an eccentric 91. This is encompassed by a strap 92 partaking of the same motion as the strap 77 and comparably carrying a channel 93. The other end of the channel is borne by an eccentric strap 94 encompassing an eccentric 96 on the drive shaft 23. Substantially duplicate mechanism is provided in the lower portion of the mechanism, so that bars 97 are arranged immediately opposite the bars 86, and carry comparable plates 98 and angle supports 99 opposite the supports 88.

When the structure is placed in operation, the supports 88 and 99 of the "A" system, operating in a clockwise direction as seen in Fig. 6, rotate in the direction of the circle 101 therein so that they engage beneath the lower ends of the end can 51 on the supporting plate 73. As the parallel rotation of the supports 88 and 99 continues, the can 51 is lifted from the support 73 in a circular path, passes above the top of the initial upright guide 66 and, as the rotation of the "A" bars 86 and 97 continues, descends in a generally arcuate path between the successive guides 66 and 67. The space between the guides is somewhat greater than the diameter of the can, so that some freedom of movement is provided, and, in addition, the transverse extent of the supports 88 and 99 is sufficient so that the supports partake of a transverse movement with respect to the vertical path of movement of the can through the channel defined by the guides 66 and 67; that is to say, as the can 51 descends between these guides, and as the supports 88 and 99 continue in the rotary path 101, the supports have increasingly great transverse components of movement as the vertical descending components decrease. In effect, therefore, the supports are gradually withdrawn transversely or laterally from beneath the can.

Since the "B" system operates in an appropriate phase relationship but in the reverse direction to the operation of the "A" system, at about the time the supports 88 and 99 are withdrawing transversely, or substantially transversely, from beneath the can 51, the supports 49 and 63 of the "B" system are following a circular path 102 so that they gradually project transversely as the downward component of their movement increases, to engage beneath the lower ends of the can projecting outwardly beyond the intermediate guides 66 and 67. The can 51 thereupon rests upon the supports 49 and 63 and is lowered between the confines of the guides 66 and 67 for substantially the diameter of the circle 102. As the supports 49 and 63 are withdrawn gradually, in accordance with their rotary parallel motion, successive supports 88 and 99 of the "A" system, following its rotary parallel motion, engage beneath the lower projecting corners of the can and permit it to lower for another approximate diameter of the circle 101.

The direction of advance of the can 51 is therefore substantially rectilinear in a vertical direction since it is confined between the guides 66 and 67; yet the motion of the various supports is circular, so that the can is accelerated and decelerated alternately. In addition, the contents thereof are further agitated due to some lateral or transverse movement of the can, so that the heat transfer to the can contents from the steam or water bath within the chamber 8 is efficient and rapid.

When the can 51 approaches the lower portion of the guide 67, it is carried beneath the lower terminus thereof by the particular guides 49 and 63 of the "B" system in a circular path represented by the circle 103 of Fig. 6. The can is thus carried around one of the curves in the sinuous path and its movement then is upwardly in the second or "B" channel until it is carried around the upper end thereof by supports 88 and 99 on a successive vertical component of the "A" system in a fashion quite comparable to its movement through the circle 101. The last movement, however, over the upper terminus of an intermediate guide 68, is in accordance with the circle 104 in Fig. 6.

Each time the "A" system completes a rotation it removes a can from the support 73 and starts it on its journey through the chamber 8. The speed of rotation is such that when the can has occupied the chamber for the requisite time for cooking it arrives at the outlet of the machine, from which it is discharged by being deposited on a plate (not shown) entirely comparable to the plate 72 from which it can be removed by any suitable mechanism.

I claim:

1. A processor comprising a housing, at least two bars in said housing, can supports projecting from each of said bars, means for bodily moving said bars simultaneously in vertical and horizontal directions and with relative vertical movement with respect to each other, and stationary guides in said housing for confining cans on said supports to a predetermined path of travel.

2. A processor comprising a housing, at least two bars in said housing, can supports projecting from each of said bars, means for bodily moving said bars simultaneously in vertical and horizontal directions and with relative vertical movement with respect to each other, and a pair of stationary vertical guides in said housing for confining cans on said supports to a predetermined path of travel.

3. A processor comprising a housing, at least two parallel vertical bars in said housing, can supports projecting from each of said bars, a pair of parallel guides in said housing, and means for alternately moving said bars into a position between and to one side of said guides, the motion of said bars in said position having a major component in a predetermined direction.

4. A processor comprising a housing, at least two parallel vertical bars in said housing, can supports projecting from each of said bars, a pair of oppositely rotating eccentric members, means for imparting the eccentric motion of said members to said bars, and means for preventing cans on said supports from partaking of said eccentric motion.

5. A processor comprising a frame, a housing on said frame, at least two parallel vertical bars in said housing, can supports projecting from each of said bars, means joining said bars to rings, eccentric discs rotatable in said rings, and means for driving said discs in opposite directions at the same rate of rotation.

6. A processor comprising at least two vertical bars in close proximity, can supports projecting from each of said bars, means joining said bars to eccentric rings, eccentric discs rotatable in said rings, and means for rotating said discs in opposite directions.

7. A cooker comprising a frame, at least two parallel vertical bars, can supports projecting from each of said bars, means joining opposite ends of said bars to eccentric rings, eccentric discs rotatable in said rings, means for rotating said discs in opposite directions, and guides on said frame each located substantially to coincide with the central position of the adjacent one of said bars and to one side of said bars.

8. A processor comprising a frame, a housing on said frame, at least two vertical bars within said housing, can supports projecting from each of said bars, means joining opposite ends of said bars to eccentric rings, eccentric discs rotatable in said rings, means for rotating said discs in opposite directions, and stationary guides within said housing for cans on said supports.

9. A processor comprising a pair of vertical guides, and a vertical bar having a projecting can support thereon constrained to move into a position between and to one side of said guides with a rotary parallel motion.

10. A processor comprising can guiding means forming the opposite sides of a predetermined path, a vertical bar, can supports projecting from said bar for cans guided by said guiding means, and means for moving said bar relative to said guiding means with a motion such that said bar remains parallel to itself and every point on said bar moves in a circular path having a fixed radius.

11. A processor comprising a vertical bar adapted to move with a motion such that said bar remains parallel to itself and every point on said bar moves in a circular path having a fixed radius, a can support projecting from said bar, and means forming the opposite sides of a predetermined path for guiding a can on said support.

12. A processor comprising a housing, at least two vertical bars within said housing, means for imparting rotary parallel motion to each of said bars but in opposite directions, can supports projecting from each of said bars, and stationary guides forming the opposite sides of a predetermined path within said housing for cans on said supports.

13. A processor comprising a housing, at least two vertical bars within said housing, means for imparting rotary parallel motion to each of said bars in such amounts, phase relationship and directions that said bars alternately sweep through the same space, can supports projecting from each of said bars, and stationary means within said housing for guiding cans on said supports.

14. A processor comprising a frame, at least two vertical bars, can supports projecting from each of said bars, means joining opposite ends of said bars to eccentric rings, eccentric discs rotatable in said rings, means for rotating said discs in opposite directions whereby said bars are moved so that points thereon describe circles, and guides on said frame each located parallel to said bars and substantially in registry with diameters of said circles and to one side of said bars.

JOHN T. TUCKER.